Patented Apr. 13, 1948

2,439,528

UNITED STATES PATENT OFFICE 2,439,528

AZINES AS OLEFIN POLYMERIZATION CATALYSTS

Milton J. Roedel, Talleyville, Del., assignor to E. I. du Pont de Nemours & Company, Wilmington, Del., a corporation of Delaware No Drawing. Application September 12, 1944, Serial No. 553,809

5 Claims. (Cl. 260—94)

This invention relates to improvements in the catalytic polymerization of organic compounds containing monoethylenic unsaturation.

It is known that ethylene and other monoolefins can be polymerized with the aid of catalysts such as oxygen, persulfates, dialkyl dioxides, acyl peroxides, chloroamine T, manganese dioxide, amine oxides, tetraphenyltin, tetraethyllead, butyllithium, hexachloroethane, etc.

This invention has as an object a new and improved method for polymerizing organic compounds containing monoolefinic unsaturation. Another object is to provide a new process for polymerizing monoolefinic hydrocarbons alone and in admixture with other organic compounds containing monoethylenic unsaturation. Still another object is to provide a new process for polymerizing ethylene alone and in admixture with other polymerizable compounds containing monoethylenic unsaturation. Further objects reside in the provision of a new class of catalysts for the polymerization of ethylene alone and in admixture with other organic compounds containing monoethylenic unsaturation to produce polymers having the valuable industrial properties hereinafter described. Other objects will appear as the description proceeds.

The above objects are accomplished by conducting the polymerization at elevated temperatures in contact with an azine as a catalyst.

The term "azine" is used herein in the sense defined on page 393 in Sedgwick's "Organic Chemistry of Nitrogen," 1942 edition, and refers to compounds having the grouping

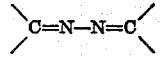

These compounds can be prepared by reacting 2 moles of a ketone or an aldehyde with 1 mole of hydrazine according to the following equation:

where R equals a hydrogen atom and/or an alkyl, alkaryl or aryl group. Typical examples of azines include dimethylketazine, diphenylketazine, sym. and unsym. methyl phenyl ketazine, dicyclohexylketazine, acetalazine, benzalazine, furfuralazine, and the like.

The organic compounds containing monoethylenic unsaturation used in the practice of this invention are those compounds of this kind which are known to polymerize and in which the sole carbon to carbon unsaturation is the group

Examples of these compounds which are operable in the practice of this invention include ethylene, propylene, the butylenes, tetrafluoroethylene, vinyl fluoride, vinylidene fluoride, vinyl chloride, vinyl acetate, vinyl propionate, vinyl benzoate, vinyl isobutyrate, vinyl thiolacetate, vinyl dimethylacetate, vinyl trimethylacetate, vinyl laurate, vinyl hexenoate, and other organic vinyl esters, vinylidene chloride, vinyl ketones, e. g., methyl vinyl ketone, ethyl isopropenyl ketone, etc., styrene, acrylic and methacrylic acids and their esters, nitriles, amides, and anhydrides, etc., N - vinyl amides, e. g., N - vinylphthalimide, N-vinylsuccinimide, etc.

In the practice of this invention as a batch operation, a suitable reaction vessel is charged with a nonpolymerizable liquid medium and the desired azine as a catalyst. The vessel is closed, placed in a heated shaker machine, and connected to a source of organic compound containing monoolefinic unsaturation. Controlling and recording thermocouples are inserted into the reactor and the desired organic compound containing monoolefinic unsaturation is added. Heating and agitation are then started. Upon reaching reaction temperature, the reaction starts and is normally followed by a pressure decrease due to utilization of the organic compound containing monoolefinic unsaturation. The pressure within the system is maintained throughout the reaction period either by addition of fresh organic compound containing monoolefinic unsaturation or by decreasing the free space within the reactor by increasing the volume of the medium. When the reaction is complete, as evidenced by cessation of absorption of organic compound containing monoolefinic unsaturation, the vessel is cooled, bled of excess gases, opened and the reaction mixture discharged. The polymer is isolated from the reaction mixture by means well known to the art, e. g., by filtering and drying. The polymer is usually in a satisfactory form, but it may be purified by washing on a mill, by solvent extraction, by means of steam distillation, drying, etc. When the products are liquid hydrocarbons, they may be purified by steam distillation, fractional distillation, treatment with decolorizing agents, etc., as desired.

A modification of the above process includes polymerizing the organic compound containing monoolefinic unsaturation, e. g., with ethylene, with another polymerizable organic compound containing monoolefinic unsaturation, e. g., propylene or vinyl acetate. The organic compound to be polymerized with the ethylene can be added with the catalyst, or, if it is a gas at normal temperatures and pressure, it may be expanded from pressure storage tanks into the closed reactor prior to or after pressuring with ethylene, or it may be added in admixture with the ethylene.

The proportion of organic compound containing monoolefinic unsaturation charged into the reaction vessel can be varied over a wide range. Control of this variable can be had either by varying the pressure in the reaction vessel, by varying the ratio of the liquid charge to the free state in the reactor, by varying the reaction temperature, or by a combination of these.

As a rule, the amount of catalyst will range from about 0.001% to about 5% by weight of monomer or monomers charged into the reaction vessel. It is preferred, however, to use as small an amount as possible of catalyst, as this has an effect on the molecular weight and other properties of the product obtained. As a rule the catalyst concentration will range from about 0.1% to about 2% by weight of the total monomer or monomers charged into the reaction vessel.

The practice of this invention is illustrated by the following examples in which parts are by weight unless otherwise specified.

Example 1

A stainless steel pressure reactor is flushed with oxygen-free nitrogen and is charged with 88 parts of benzene and 0.5 part of benzalazine

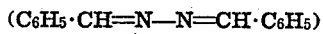

$(C_6H_5 \cdot CH{=}N{-}N{=}CH \cdot C_6H_5)$

This charge occupies about 25% of the volume of the reactor. After removal of the nitrogen by evacuation to constant pressure, the reactor is charged with ethylene to a pressure of 150 atmospheres and heated to 200° C. Upon reaching this temperature the ethylene pressure is raised to 910 atmospheres and the polymerization is allowed to proceed with agitation of the vessel for a 15-hour period. As the ethylene polymerizes, the system is kept between 850 and 950 atmospheres pressure by the addition of more ethylene. The total pressure drop is about 200 atmospheres. The reactor is cooled and the excess ethylene bled off. There is obtained 17 parts of a solid crystalline ethylene polymer having an intrinsic viscosity of 0.83 (measured as a 0.125% solution in xylene at 85° C.) which corresponds to a molecular weight of about 14,900.

This ethylene polymer is very tough, possessing a tensile strength of 2630 lbs./sq. in. at 670 percent elongation, contains an inappreciable quantity of grain, is soluble to the extent of at least 40 percent by weight in xylene at 100° C., and is very extrudable at 190° C. This tough, workable ethylene polymer is especially well suited for the fabrication of wrapping films and foils, oriented monofils, fibers, extruded rigid and collapsible tubing, calendered sheeting, cable insulation and other uses.

Example 2

A stainless steel pressure reactor is flushed with oxygen-free nitrogen and is charged with 100 parts of deoxygenated water and 0.5 part of benzalazine. This charge occupies about 25% of the volume of the reactor. After removal of the nitrogen by evacuation to constant pressure, the reactor is charged with ethylene to a pressure of 235 atmospheres and heated to 200° C. Upon reaching this temperature the ethylene pressure is raised to 950 atmospheres and the polymerization is allowed to proceed with agitation of the vessel. As the ethylene polymerizes, the system is kept between 810 and 980 atmospheres pressure by the addition of more ethylene. After a 14-hour period the reactor is cooled and the excess ethylene is bled off. There is obtained 18 parts of solid, crystalline ethylene polymer having an intrinsic viscosity of 0.91 (measured as a 0.125% solution in xylene at 85° C.) which corresponds to a molecular weight of about 15,900.

Example 3

A stainless steel pressure reactor is flushed with oxygen-free nitrogen and is charged with 88 parts of benzene and 0.5 part of diphenylketazine $((C_6H_5)_2C{=}N{-}N{=}C(C_6H_5)_2)$. This charge occupies about 25% of the volume of the reactor. After removal of the nitrogen by evacuation to constant pressure, the reactor is charged with ethylene to a pressure of 100 atmospheres and heated to 225° C. Upon reaching this temperature the ethylene pressure is raised to 950 atmospheres and the polymerization is allowed to proceed with agitation of the vessel for a 15-hour period. As the ethylene polymerizes, the system is kept between 840 and 950 atmospheres pressure by the addition of more ethylene. The total pressure drop is about 720 atmospheres. The reactor is cooled and the excess ethylene is bled off. There is obtained 70 parts of a solid, crystalline ethylene polymer which melts to a free flowing liquid at 102° C., is soluble in all proportions in xylene at 100° C., and possesses a tensile strength of 800 lbs./sq. in. at 230 percent elongation. This low molecular weight, very workable ethylene polymer is well suited for hot-dip or melt-spray application for inert, moistureproof coatings on paper, leather, fabrics, black plate, and like uses.

In some instances it may be desirable to replace the organic medium by water or to use a mixture of water and an organic solvent such as benzene. Suitable organic media which can be used in place of benzene include isooctane, toluene, alcohols such as tert.-butyl alcohol, ethers, etc.

Bulk polymerization in the absence of an inert medium may also be employed.

It is preferable to use reagents as pure as is commercially feasible. In general, the process is operated under conditions such that the molecular oxygen content of the system is less than 1000 parts per million with 200 parts per million being preferred and under 10 parts per million giving preferred products.

The present invention provides a new class of catalysts for the polymerization of organic compounds containing mono-ethylenic unsaturation and especially of ethylene. These catalysts are effective in small quantities and yield polymers which are free of oxygen and inorganic residues. Furthermore, in distinction to peroxides, they are stable to shock, contain no oxygen, and are relatively easy to prepare from ketones or aldehydes. They are also effective over a wide range of temperatures and pressures and can be used in the presence of a variety of materials.

The azine catalysts used in the present process are operable at temperatures which may be as low as 60° C. and as high as 400° C. It is generally preferred to operate at temperatures in the range of 100° to 250° C. and at pressures in excess of atmospheric. In general, pressures in excess of 4 atmospheres can be used and more usually pressures in the range of 200-3000 atmospheres are employed.

As a rule, the use of higher pressures permits the use of lower temperatures. The particular conditions of temperature and pressure in any one case are determined not only by the particular azine catalyst used, but also by the material being polymerized. Temperatures and pressures are interdependent variables and the conditions for optimum results in any one instance have to be determined experimentally.

The present azine catalysts are rapid and enduring their activity, and the limit of their effectiveness is reached only when the free space within the reactor is completely occupied with products so that no more monomer or monomers can be introduced. In view of this fact, it is usually advantageous to employ these catalysts in a continuous polymerization system from which the products are removed continuously. Such a continuous process may be exemplified by the passage of the whole polymerization mixture through a reaction zone maintained at appropriate polymerizing conditions or by passing the reactants separately through a mixing chamber, then through a reaction zone or by pumping the reactants separately through a reaction zone and introducing the catalyst in solution or suspension immediately prior to entering the reaction zone. In a continuous process, the catalyst solution or suspension can be introduced at intermediate stages throughout the reaction zone, since by this means the heat developed in any one portion of the apparatus is relatively small and consequently the polymerization can be carried through to a desired high molecular weight product. The present process is exothermic in character and, as in any process where the amount of heat to be removed is large, a continuous process permits of greater precision in control and consequently more uniformly excellent results.

The catalysts of this invention are operable in the absence of agitation but in many instances good agitation is conducive to good yields of polymers.

The products produced in accordance with this invention are useful for hot-dip and melt-spray applications, for conversions to wrapping foils, films, electrical and thermal insulating materials, filaments, protective coatings, and for many other pruposes well known to the art.

The term "polymer" is used herein in a generic sense to refer to the macromolecular products obtained by polymerizing one or more organic compounds containing monoolefinic unsaturation.

I claim:

1. In a process involving the polymerization of ethylene at a temperature between 60° and 400° C. and a pressure between 200 and 3000 atmospheres, the step which comprises conducting the polymerization of ethylene in the presence of from 0.001 to 5% of benzalazine based on the total weight of monomers charged into the reactor there being present during the reaction not more than 1000 P. P. M. of oxygen.

2. A process for the preparation of extrudable polymers of ethylene which comprises poylmerizing ethylene at a temperature between 100 and 250° C. at a pressure between 200 and 3000 atmospheres, in the presence of from 0.001 to 5% of diphenylketazine based on the weight of monomer and a nonpolymerizable inert organic liquid medium there being present during the reaction not more than 1000 P. P. M. of oxygen.

3. In a process for the polymerization of ethylene, the step which comprises carrying out the polymerization of ethylene under pressure in excess of 4 atmospheres and at a temperature between 60° and 400° C. in the presence of from 0.001 to 5%, based on the weight of monomer of an azine catalyst having the formula

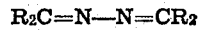

$$R_2C=N-N=CR_2$$

in which one R of each $R_2$ group is a member of the class consisting of hydrogen, alkyl, alkaryl and aryl groups; the other R of the same $R_2$ group is a member of the class consisting of alkyl, alkaryl, and aryl groups, the formula of the azine having a symmetrical structure, there being present during the reaction no more than 1000 P. P. M. of oxygen.

4. In a process for the polymerization of a polymerizable monoolefin containing not more than 4 carbon atoms, the step which comprises carrying out the polymerization of said monoolefin under a pressure in excess of 4 atmospheres and at a temperature between 60° and 400° C., in the presence of 0.001 to 5%, based on the weight of monomer, of an azine catalyst having the formula $R_2C=N-N=CR_2$ in which one R of each $R_2$ group is a member of the class consisting of hydrogen, alkyl, alkaryl and aryl groups; the other R of the same $R_2$ group is a member of the class consisting of alkyl, alkaryl, and aryl groups, the formula of the azine having a symmetrical structure, there being present during the reaction no more than 1000 P. P. M. of oxygen.

5. In a process for the polymerization of ethylene, the step which comprises carrying out the polymerization of ethylene in the presence of from 0.001 to 5% of diphenylketazine, based on the weight of monomer, at a temperature between 60° and 400° C. and at a pressure between 200 and 3000 atmospheres, the reaction being conducted in the presence of less than 1000 P. P. M. of oxygen.

MILTON J. ROEDEL.

REFERENCES CITED

The following references are of record in the file of this patent:

UNITED STATES PATENTS

| Number | Name | Date |
|---|---|---|
| 2,369,371 | Seiberich | Feb. 13, 1945 |